(12) United States Patent
Xie et al.

(10) Patent No.: US 7,882,266 B2
(45) Date of Patent: Feb. 1, 2011

(54) METHOD AND SYSTEM FOR NEGOTIATING INTERFACE DATA PATH ESTABLISHMENT

(75) Inventors: Yong Xie, Guangdong Province (CN); Jianjun Wu, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 237 days.

(21) Appl. No.: 11/970,041

(22) Filed: Jan. 7, 2008

(65) Prior Publication Data

US 2008/0104192 A1    May 1, 2008

Related U.S. Application Data

(63) Continuation of application No. PCT/CN2006/001636, filed on Jul. 11, 2006.

(30) Foreign Application Priority Data

Jul. 11, 2005    (CN) .................. 2005 1 0082845

(51) Int. Cl.
*G06F 15/173* (2006.01)
*G06F 15/16* (2006.01)
*H04L 12/28* (2006.01)

(52) U.S. Cl. .................. 709/238; 709/227; 709/249; 370/351; 370/254

(58) Field of Classification Search .............. 709/212, 709/238
See application file for complete search history.

(56) References Cited

U.S. PATENT DOCUMENTS 6,131,025 A * 10/2000 Riley et al. .............. 455/414.1

(Continued)

FOREIGN PATENT DOCUMENTS

CN    1794869    6/2006

(Continued)

OTHER PUBLICATIONS

Fahldieck & Brandt, Primitives for Radio Resource Management (RRM), IEEE 802.16 Broadband Wireless Access Working Group—C802.16g-05/020 (Apr. 29, 2005).*

(Continued)

*Primary Examiner*—Saleh Najjar
*Assistant Examiner*—Robert Shaw
(74) *Attorney, Agent, or Firm*—Finnegan, Henderson, Farabow, Garrett & Dunner LLP

(57) ABSTRACT

A method and system for negotiating interface data path establishment is provided in the invention, including: making a decision, by Target ASN-GW, on whether to establish an R4 data path or an redirect R3 data path, and sending a corresponding request to the Anchor ASN-GW according to the decision; and determining a negotiation result, by the Anchor ASN-GW, according to the corresponding request from the Target ASN-GW, or the corresponding request from the Target ASN-GW and a local decision, and returning a reply to the Target ASN-GW according to the negotiation result. In this way, the R3 data path is redirected if either the Target ASN-GW or the Anchor ASN-GW determines to redirect the R3 data path; and an R4 data path is established only if both the Target ASN-GW and the Anchor ASN-GW determine to establish the R4 data path.

10 Claims, 7 Drawing Sheets

U.S. PATENT DOCUMENTS

| | | | |
|---|---|---|---|
| 6,421,714 B1 | 7/2002 | Rai et al. | |
| 6,961,571 B1 | 11/2005 | Rune et al. | |
| 7,079,499 B1* | 7/2006 | Akhtar et al. | 370/310 |
| 2001/0036830 A1* | 11/2001 | Wu et al. | 455/436 |
| 2002/0085549 A1* | 7/2002 | Reza et al. | 370/389 |
| 2002/0167922 A1* | 11/2002 | Inoue et al. | 370/331 |
| 2003/0103496 A1* | 6/2003 | Lakshmi Narayanan et al. | 370/352 |
| 2003/0142660 A1* | 7/2003 | Nishimura et al. | 370/351 |
| 2003/0176188 A1* | 9/2003 | O'Neill | 455/433 |
| 2004/0054718 A1* | 3/2004 | Hicks et al. | 709/203 |
| 2004/0142693 A1* | 7/2004 | Feder et al. | 455/443 |
| 2004/0192309 A1* | 9/2004 | Watanabe et al. | 455/439 |
| 2004/0264435 A1* | 12/2004 | Chari et al. | 370/351 |
| 2005/0018613 A1* | 1/2005 | Yokota | 370/248 |
| 2005/0102421 A1* | 5/2005 | Horvath et al. | 709/238 |
| 2005/0102529 A1* | 5/2005 | Buddhikot et al. | 713/200 |
| 2005/0249161 A1* | 11/2005 | Carlton | 370/331 |
| 2005/0286471 A1* | 12/2005 | Yang et al. | 370/331 |
| 2006/0018280 A1* | 1/2006 | Kumar et al. | 370/331 |
| 2006/0056448 A1* | 3/2006 | Zaki et al. | 370/466 |
| 2006/0140150 A1* | 6/2006 | Olvera-Hernandez et al. | 370/331 |
| 2006/0182061 A1* | 8/2006 | Naghian | 370/331 |
| 2006/0206597 A1* | 9/2006 | Kim et al. | 709/220 |
| 2006/0215607 A1* | 9/2006 | Mitchel et al. | 370/331 |
| 2006/0274694 A1* | 12/2006 | Rajkumar et al. | 370/331 |

FOREIGN PATENT DOCUMENTS

| | | |
|---|---|---|
| CN | 1794870 | 6/2006 |
| CN | 100450291 | 1/2009 |
| EP | 0 844 797 | 5/1998 |
| GB | 2332129 | 6/1999 |
| JP | 2003224589 | 8/2003 |
| JP | 2003530042 | 10/2003 |

OTHER PUBLICATIONS

Zaki & Kiernan, 802.16g Reference Models and Network Architecture, IEEE C802.16g-04/12., (Nov. 5, 2004).*

Combined PMIP-CMIP-coexistence stage 2 text, WiMAX Forum Network Working Group, Jun. 27, 2005, pp. 0-32.

English translation of the Written Opinion of the International Searching Authority for International application No. PCT/CN2006/001636, mailed Nov. 2, 2006, 3 pgs.

Japanese Office Action for application No. 2008-520694, mailed Aug. 17, 2010, 10 pgs., partial English translation attached.

IEEE 802.16 Broadband Wireless Access Working Group, "Primitivies for Radio Resource Management (RRM)", Apr. 29, 2005, 10 pgs.

WiMAX Forum Network Working Group, "R4 Scope and Primitives", 050531_NWG_Intra_ASN_R4-01.doc, Sep. 13, 2010, 13 pgs.

WiMAX Forum Network Working Group, "R4 Scope and Primitives", 050531_NWG_Intra_ASN_R4-01.doc, Sep. 13, 2010, 13 pgs.

IEEE, Draft Standard for Local and Metropolitan Area Networks; Part: 16 Air Interface for Broadband Wireless Access Systems, P802.16Rev2/D9a Mar. 2009, 2098 pgs.

LanMan Standards Committee of the IEEE, Draft Standard for Local and Metropolitan Area Networks; Part: 16 Air Interface for Fixed Broadband Wireless Access Systems, P802.16Revd/D5-2004, May 2004, 915 pgs.

* cited by examiner

METHOD AND SYSTEM FOR NEGOTIATING INTERFACE DATA PATH ESTABLISHMENT

CROSS-REFERENCES TO RELATED APPLICATIONS

The present application is a continuation of PCT Application No. PCT/CN2006/001636, filed on Jul. 11, 2006, which claims a priority to Chinese Patent Application No. 200510082845.0, filed on Jul. 11, 2005. All of these applications are incorporated herein by reference for all purposes.

FIELD OF THE INVENTION

The present invention relates to the field of mobile communication, particularly to a method and system for negotiating interface data path establishment in a wireless access network.

BACKGROUND OF THE INVENTION

The IEEE 802.16 Standard has defined a Broadband Wireless Access (BWA)-based Wireless Metropolitan Area Network (WMAN) standard, and different physical layer techniques are defined for different frequency bands with respect to applications mainly in Residential Community, Small Office/Home Office (SOHO), Remote Access, and Small Enterprise (SME) markets.

Media Access Control (MAC) defined in IEEE 802.16 is suitable for harsh subscriber environments. The MAC can cope with an application environment with each channel shared by hundreds or thousands of subscribers, and support different traffic such as continuous and burst traffic. The MAC provides an Asynchronous Transfer Mode (ATM) convergence sub-layer and a packet convergence sub-layer. Through processing by the convergence sub-layers, multiple data units from higher layers are encapsulated into a MAC Protocol Data Unit (PDU) for transmission, thereby implementing protocol transparency for ATM, Internet Protocol (IP), and Ethernet services.

The Worldwide Interoperability Microwave Access (WiMAX) is an organization in worldwide microwave access interoperability industry, and aims at facilitating worldwide popularization and application of the IEEE 802.16 series (IEEE 802.16, IEEE 802.16d, IEEE 802.16e) air interface protocols. The WiMAX mentioned herein refers to a network entity that conforms to the IEEE 802.16 air interface protocols.

As shown in FIG. 1, the WiMAX includes a Mobile Subscriber Station/Subscriber Station (MSS/SS), an Access Service Network (ASN), and a Connectivity Service Network (CSN).

1. ASN—Access Service Network

ASN is defined as a set of network functions that provide wireless access service for a WiMAX MSS/SS. An ASN includes network elements of a BS and an ASN-Gateway (GW), and may be shared by multiple CSNs. The MSS/SS is connected to a BS via an R1 interface, BSs are connected to each other via an R8 interface, a BS is connected to an ASN-GW via an R4 interface, and an ASN-GW is connected to a CSN via an R3 interface.

A BS provides an L2 connection between the BS and an MSS/SS, and functions of wireless resource management, measurement and power control, and air interface data compression and encryption, etc.; An ASN-GW provides proxy function for authentication, authorization, and accounting on an MSS/SS, supports network discovery and selection of an NSP, and provides L3 Relay functions (e.g. IP address assignment) for the MSS/SS; in addition, the ASN-GW can provide optional functions such as intra-ASN switching, MSS/SS paging and location management, tunnel management between the ASN and the CSN and visit location registration.

2. CSN—Connectivity Service Network

A CSN is defined to provide IP connection service for a WiMAX MSS/SS. The CSN mainly provides the functions of IP address assignment for the MSS/SS, Internet access, AAA proxy server or server, subscriber-based authorization control, establishment and management of a tunnel between an ASN and the CSN, accounting on WiMAX subscribers and settlement between operators, establishment and management of a tunnel between CSNs and inter-ASNs switching in the case of a roaming MSS/SS, and various WiMAX services (e.g. location-based services, multimedia multicast and broadcast services, IP Multimedia Subsystem services), etc.

3. MSS/SS—Mobile Subscriber Station

MSS/SS is a (mobile) User Equipment, with which a subscriber accesses the WiMAX network.

During the movement of the MSS/SS from the coverage area of BS1 to the coverage area of BS2, after the MSS/SS accomplishes re-entry to a Target BS/ASN-GW, the communication path between the MSS/SS and the CSN needs to be reestablished, with either of the following two methods:

a first method as shown in FIG. 1, in which a new R4 data path is established between the current Serving ASN-GW for the MSS/SS and the Target ASN-GW; the original communication path is indicated as the black heavy solid line in FIG. 1, while the new communication path is indicated as the black heavy dot and dash line in FIG. 1 and includes the new R4 data path established and the original R3 data path;

a second method as shown in FIG. 2, in which the original R3 data path between the Serving ASN-GW and a CSN is redirected to be between the Target ASN-GW and the CSN; the original communication path is indicated as the black heavy solid line in FIG. 2, while the new communication path is indicated as the black heavy dot and dash line in FIG. 2 and includes the redirected R3 data path only.

According to content of relevant draft standards defined by WiMAX currently with respect to Intra ASN R4, during the relocation of the MSS/SS to the Target ASN-GW, an interface data path for the MSS/SS to access the CSN via the Target ASN-GW is established through the following negotiation steps as shown in FIG. 3 after the MSS/SS accomplishes re-entry to the Target BS and the Target ASN-GW.

1. The Target ASN-GW sends an R4 data path establishment request message (Data Path Establishment REQ) to an Anchor ASN-GW (i.e. the Serving ASN-GW for the MSS/SS before the MSS/SS is switched to the Target ASN-GW).

2. If deciding to establish an R4 data path, the Anchor ASN-GW establishes an R4 data path directly, and returns to the Target ASN-GW an R4 data path establishment response message (Data Path Establishment RES) carrying the information related to the R4 data path establishment; when receiving the R4 data path establishment response message, the Target ASN-GW establishes an R4 data path at the local side, and the MSS/SS accesses the CSN via the R4 interface and the R3 interface;

if deciding to redirect the R3 data path, the Anchor ASN-GW includes a Redirection indication in the Data Path Establishment RES message to be returned, to instruct the Target ASN-GW to redirect the R3 data path.

3. Upon receipt of the returned Data Path Establishment RES message carrying the Redirection indication from the Anchor ASN-GW, the Target ASN-GW returns an acknowledgement (ACK) message to the Anchor ASN-GW.

4. Upon receipt of the acknowledgement message, the Anchor ASN-GW sends to the Target ASN-GW a Relocate REQ message carrying the information related to the R3 data path establishment, where the information includes ID information of the MSS/SS, current service information of the MSS/SS, and path information, etc.

5. Upon receipt of the Relocate REQ message, the Target ASN-GW is triggered to send a Registration REQ message to a Home Agent for Client Mobile Internet Protocol (CMIP)/ Proxy Mobile Internet Protocol (PMIP) registration, with the ID information of the MSS/SS, the current service information of the MSS/SS, and the like also carried in the Registration REQ message;

depending on the mobile Internet protocol (the CMIP or the PMIP) currently used by the MSS/SS, the Registration REQ message can be a CMIP registration request or a PMIP registration request, where the CMIP registration message must be initiated by the MSS/SS, while the PMIP registration message must be initiated by a Proxy MIP Client at the network side.

6. The Home Agent returns a Registration RES message to the Target ASN-GW, and redirects the R3 data path from the Anchor ASN-GW to the Target ASN-GW.

7. Upon receipt of the Registration RES message returned from the Home Agent, the Target ASN-GW establishes an R3 data path and return to the Anchor ASN-GW an acknowledgement message (Relocate RES) indicating a successful R3 data path redirection.

Upon receipt of the Relocate RES message, the Anchor ASN-GW performs corresponding processes, such as release of the R3 connection.

The existing method is inflexible. At step 2, for example, if the Anchor ASN-GW chooses to establish an R4 data path, the Target ASN-GW has to simply establish an R4 data path, but is unable to choose to redirect an R3 data path according to actual conditions of the Target ASN-GW itself, such as the available bandwidth of R4 and R3 interfaces, the QoS requirement, and other factors. In addition, the message exchange at steps 2, 3, and 4 of the existing process flow is very complex, resulting in longer switching delay.

SUMMARY OF THE INVENTION

The present invention provides a method and system for negotiating interface data path establishment, which is applicable to negotiating establishment of an interface data path, through which an MSS/SS accesses a CSN, between a Target ASN-GW and an Anchor ASN-GW when the MSS/SS is switched to the Target ASN-GW, thereby avoiding inflexible decision making in the prior art, i.e. no decision making according to actual conditions of the Target ASN-GW, which is due to the fact that when an interface data path through which the MSS/SS accesses the CSN is to be established, whether to establish an R4 data path or redirect an R3 data path is determined only by the Anchor ASN-GW.

A method for negotiating interface data path establishment, includes:

making a decision, by a Target ASN-GW for an MSS/SS, on whether to establish an R4 data path or redirect an R3 data path at an Anchor ASN-GW for the MSS/SS, and sending a corresponding request to the Anchor ASN-GW according to the decision; and determining a negotiation result, by the Anchor ASN-GW, according to the corresponding request from the Target ASN-GW, or the corresponding request from the Target ASN-GW and a local decision, and returning a reply to the Target ASN-GW according to the negotiation result.

In the method, the determining a negotiation result by the Anchor ASN-GW includes:

determining, by the Anchor ASN-GW, the negotiation result as establishing an R4 data path if both the request from the Target ASN-GW and the local decision instruct to establish an R4 data path;

determining directly, by the Anchor ASN-GW, the negotiation result as redirecting the R3 data path if the request from the Target ASN-GW instructs to redirect the R3 data path; and determining, by the Anchor AS N-GW, the negotiation result as redirecting the R3 data path if the request from the Target ASN-GW instructs to establish an R4 data path, but the local decision instructs to redirect the R3 data path.

In the method, if the negotiation result determined by the Anchor ASN-GW instructs to redirect the R3 data path, the method further includes:

returning, by the Anchor ASN-GW, a message containing relevant information required to redirect the R3 data path, to the Target ASN-GW;

triggering, by the Target ASN-GW, an MIP registration initiated to the Home Agent (HA), according to the message returned; and returning, by the Target ASN-GW, a message containing the information on the R3 data path redirection result to the Anchor ASN-GW, to notify the Anchor ASN-GW of the R3 data path redirection result.

The relevant information required to redirect the R3 data path includes context information required to redirect the R3 data path, where the context information includes Anchor DPF Info, and/or Anchor SFA Info, and/or Anchor DHCP Proxy or Relay Info, and/or Anchor Accounting Client Info.

The message containing the relevant information required to redirect the R3 data path returned from the Anchor ASN-GW to the Target ASN-GW is an R4 data path establishment request message provided with R3 redirection indication information, and also with an extended information field for carrying the relevant information required to redirect the R3 data path.

In the method, if the negotiation result determined by the Anchor ASN-GW instructs to establish an R4 data path, the method further includes:

establishing, by the Anchor ASN-GW, an R4 data path, and returning an R4 data path establishment request message to the Target ASN-GW; and establishing, by the Target ASN-GW, an R4 data path according to the message returned, and returning an acknowledgement message of the R4 data path establishment to the Anchor ASN-GW.

If the request from the Target ASN-GW instructs to redirect the R3 data path, then identification information of the relevant information required to redirect the R3 data path is carried in a message of the request; and the Anchor ASN-GW returns the relevant information corresponding to the identification information to the Target ASN-GW.

In the method, the Target ASN-GW and/or the Anchor ASN-GW make a decision on whether to establish an R4 data path or redirect an R3 data path, according to the current service policy for the MSS/SS and the current conditions of network resources.

In addition, the Target ASN-GW and/or the Anchor ASN-GW choose in precedence to establish an R4 data path in making the decision.

On the basis of the alike technical concept, the present invention further discloses a system for negotiating interface data path establishment. The system includes a Target ASN-GW and an Anchor ASN-GW for MSS/SS.

The Target ASN-GW includes a decision making module adapted for deciding whether to establish an R4 data path or redirect an R3 data path at the Anchor ASN-GW for the MSS/SS, and sending a corresponding request to the Anchor ASN-GW according to the decision;

The Anchor ASN-GW includes a determining module adapted for determining a negotiation result according to the corresponding request from the Target ASN-GW, or the corresponding request from the Target ASN-GW and a local decision, and returning a reply to the Target ASN-GW according to the negotiation result.

The Anchor ASN-GW further includes:

a storage module connected to the determining module and adapted for storing determining criteria including:

if both the request from the Target ASN-GW and the local decision instruct to establish an R4 data path, the Anchor ASN-GW determining the negotiation result as establishing an R4 data path;

if the request from the Target ASN-GW instructs to redirect the R3 data path, the Anchor ASN-GW determining directly the negotiation result as redirecting the R3 data path; and if the request from the Target ASN-GW instructs to establish an R4 data path, but the local decision instructs to redirect the R3 data path, the Anchor AS N-GW determining the negotiation result as redirecting the R3 data path.

The present invention has the following benefits:

In the technical solutions of the present invention, capabilities of the two parties involved in negotiation are considered comprehensively. A Target ASN-GW makes a decision on whether to establish an R4 data path or redirect an R3 data path according to resource conditions of the Target ASN-GW, for example, available bandwidth and congestion conditions of R3/R4 interface, etc., as well as a QoS requirement of a service (e.g. a real-time service may require processing nodes as less as possible), etc.; then, an Anchor ASN-GW determines, so that the R3 data path will be redirected as long as any one of the Target ASN-GW and the Anchor ASN-GW determines to redirect the R3 data path, and an R4 data path will be established only if both the Target ASN-GW and the Anchor ASN-GW instruct to establish an R4 data path.

In addition, the process flow of the R3 data path redirection in the prior art is optimized and consummated. Information related to an R3 data path is carried in a Data Path Establish Response message returned by the Anchor ASN-GW when it decides to redirect the R3 data path; as a result, the steps of exchanging response messages and acknowledgement messages are removed, thereby message cost is reduced, and a switching delay is shortened.

DETAILED DESCRIPTION OF THE EMBODIMENTS

In the two methods for establishing a communication path, the process in the first method can be accomplished just at the access network side, and the second method involves redirection of an interface at the core network side. In comparison, the first method has a shorter time delay and less affect on the network; therefore, the first method is preferred in a normal case.

According to the above analysis, the process of negotiating the establishment of a communication interface data path, through which an MSS/SS access to the CSN after the MSS/SS is switched, can be designed as follows:

step 1: The Target ASN-GW makes a decision on whether to establish an R4 data path or redirect an R3 data path according to resource conditions of the Target ASN-GW, such as the available bandwidth and congestion conditions of R3/R4 interface, etc., as well as a QoS requirement of a service (e.g. a real-time service may require processing nodes as less as possible); and sends the decision via a corresponding request message to the Anchor ASN-GW;

step 2: The Anchor ASN-GW determines according to its actual conditions whether to establish an R4 data path or redirect an R3 data path, and returns a corresponding response message to the Target ASN-GW; and step 3: The Target ASN-GW proceeds to establish an R4 data path or redirect the R3 data path according to the response message from the Anchor ASN-GW.

In that method, the R3 data path will be redirected if either of the Target ASN-GW and the Anchor ASN-GW determines to redirect the R3 data path, while an R4 data path will be established if both the Target ASN-GW and the Anchor ASN-GW instruct to establish an R4 data path.

Hereinafter, the method based on above technical concept will be described in detail with the embodiments in connection with the accompanying drawings.

According to an embodiment of the invention, the Target ASN-GW makes a decision and requests to establish an R4 data path, which the Anchor ASN-GW determines to accept.

Figure 1:
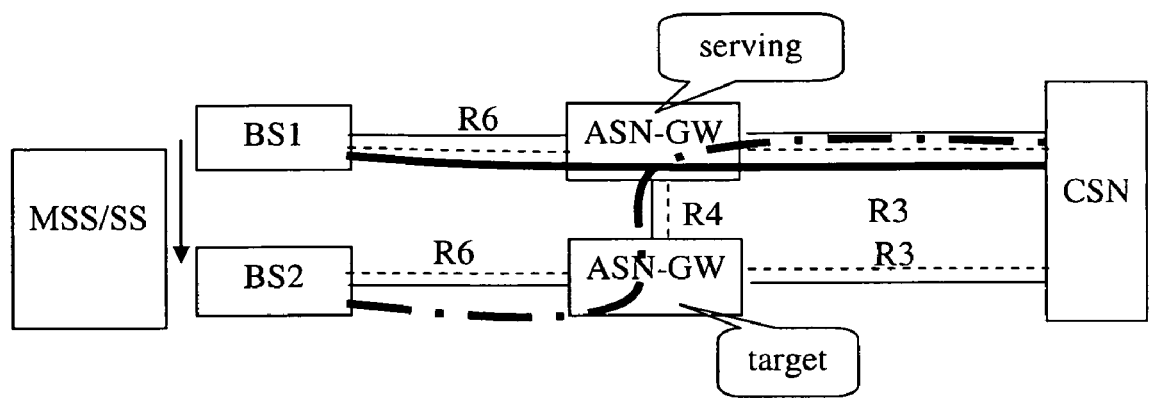
FIG. 1 is a schematic diagram of a WiMAX end-to-end reference model in the prior art.
Figure 2:
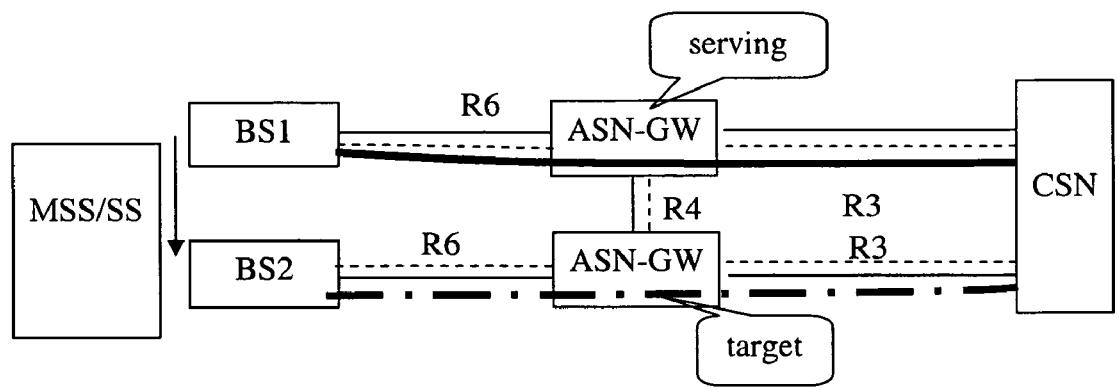
FIG. 2 is a schematic diagram of a communication path for access to the CSN implemented by redirecting the existing R3 data path after the MSS/SS is switched to the Target ASN-GW.
Figure 3:
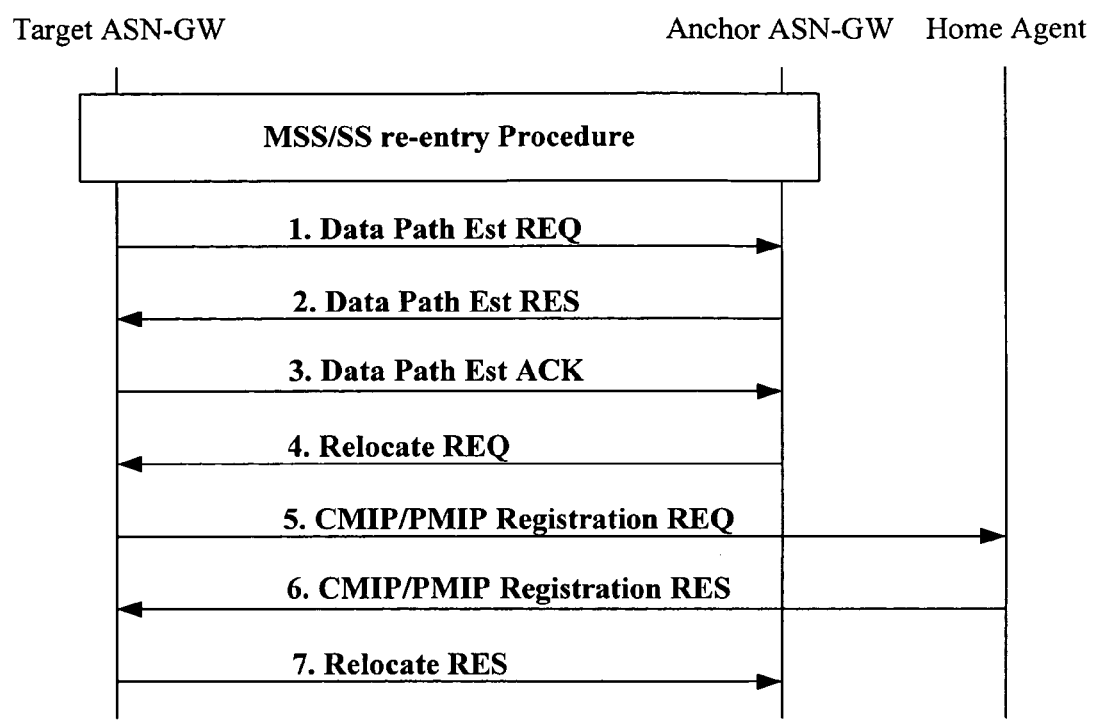
FIG. 3 is a flow diagram of redirection of the existing R3 data path in the prior art.
Figure 4:
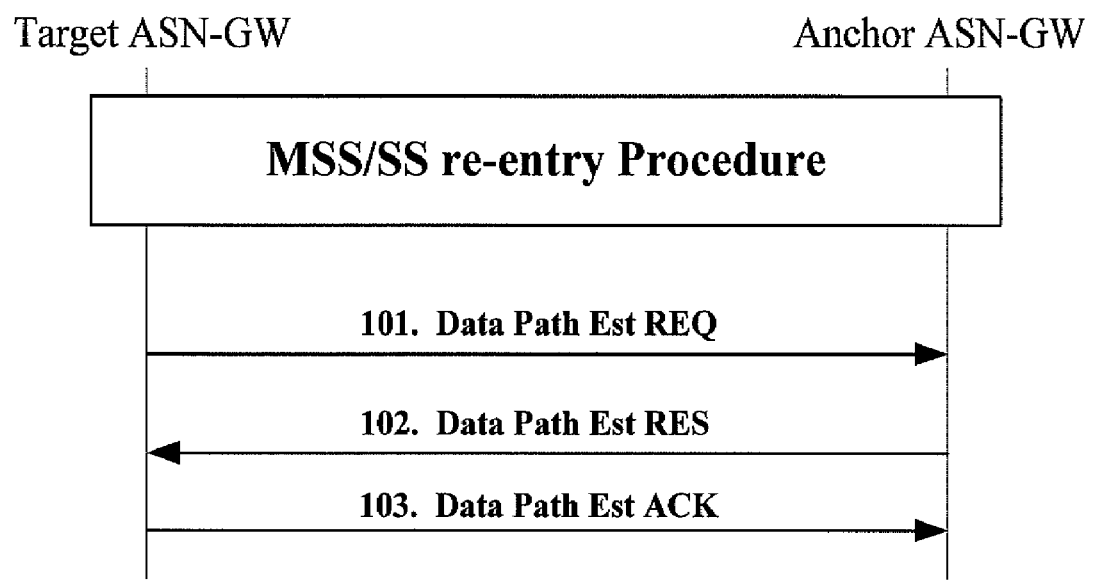
FIG. 4 is a flow diagram of the method according to a first embodiment of the present invention.

After the MSS/SS accomplishes the procedure of re-entry to the Target BS/ASN-GW, the Target ASN-GW determines, according to its resource conditions (e.g. available bandwidth and congestion conditions of R3/R4 interface, etc.), whether to establish an R4 data path or redirect the R3 data path; if being able to establish an R4 data path, the Target ASN-GW choose in precedence to establish an R4 data path, as shown in FIG. 4, the process includes the following steps:

S101: The Target ASN-GW sends a Data Path Establishment REQ message to the Anchor ASN-GW, to initiate an R4 data path establishment procedure;

S102: Upon receipt of the Data Path Establishment REQ message, the Anchor ASN-GW determines that an R4 data path can be established, then returns a Data Path Establishment RES message including relevant information such as an MSS ID, current service information of the MSS, and path information, to establish an R4 data path; and S103: Upon receipt of the Data Path Establishment RES message, the Target ASN-GW configures parameters to establish an R4 data path according to the relevant information carried in the Data Path Establishment RES message, and returns an ACK message to the Anchor ASN-GW to acknowledge that an R4 data path has been established.

According to another embodiment of the invention, the Target ASN-GW makes a decision and requests to establish an R4 data path, but the Anchor ASN-GW determines that it has to redirect an R3 data path.

Figure 5:
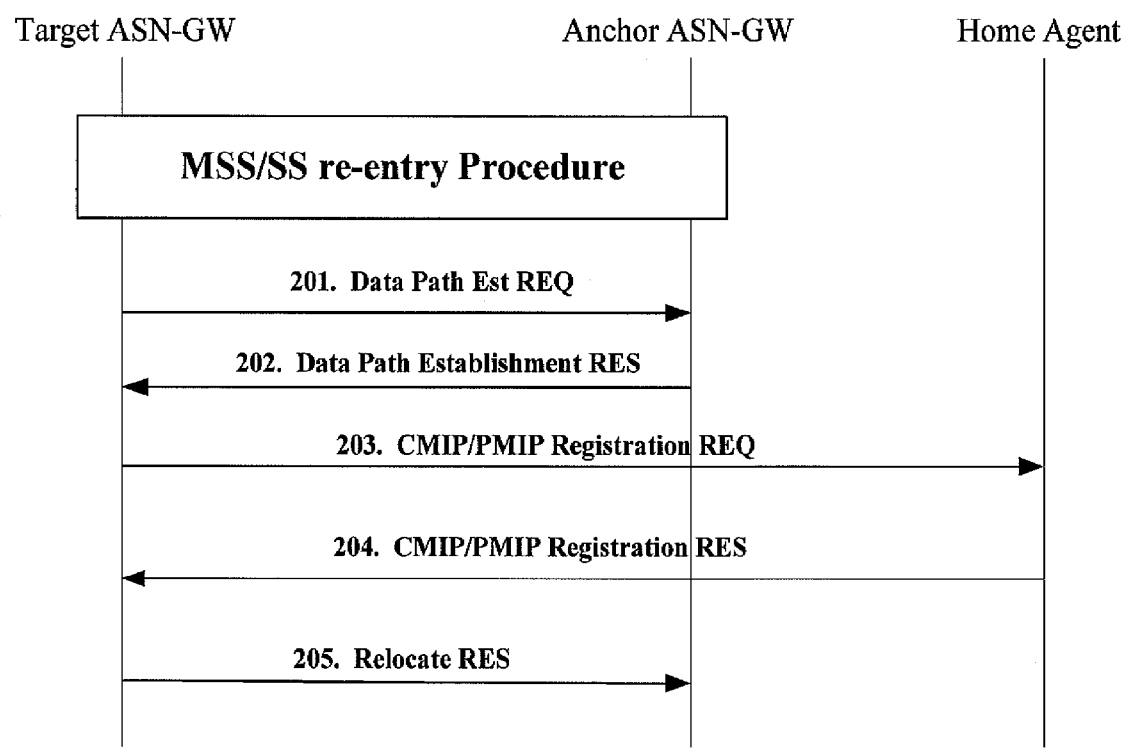
FIG. 5 is a flow diagram of the method according to an embodiment of the present invention.

After the MSS accomplishes the procedure of re-entry to the Target BS/ASN-GW, the Target ASN-GW determines, according to its resource conditions (e.g. available bandwidth and congestion conditions of R3/R4 interface, etc.), whether to establish an R4 data path or redirect the R3 data path; if being able to establish an R4 data path, the Target ASN-GW choose in precedence to establish an R4 data path, as shown in FIG. 5, the process includes the following steps:

S201: The Target ASN-GW sends a Data Path Establishment (abbreviated to "Est" in the drawing) REQ message to the Anchor ASN-GW, to initiate an R4 data path establishment procedure;

S202: Upon receipt of the Data Path Establishment REQ message, the Anchor ASN-GW determines that it has to redirect an R3 data path, and then returns a Data Path Establishment RES message, which carries indication information instructing to redirect the R3 data path, to the Target ASN-GW; the Data Path Establishment RES message includes information required to redirect the R3 data path, such as an MSS ID, MSS Info, Classification Info, Anchor DPF (Data Path Function) Info, Anchor SFA (Service Flow Authorizator) Info, Anchor DHCP (Dynamic Host Configuration Protocol) Proxy/Relay Info, Anchor Accounting Client Info, etc.;

S203: Upon receipt of the Data Path Establishment RES message, the Target ASN-GW realizes that the Anchor ASN-GW can't establish an R4 data path and an R3 data path is to be redirected; then notifies an MIP Client that the R3 data path is to be redirected, and requests the MIP Client to send an MIP Registration REQ message to a Home Agent for CMIP/PMIP registration, to request the Home Agent to redirect the R3 data path;

in the case of PMIP, the Target ASN-GW indicates, by sending a message, the current PMIP Client entity to initiate an MIP registration request to the Home Agent (HA); in the case of CMIP, the Target ASN-GW triggers its corresponding FA to sends to the MSS a Foreign Agent broadcast message, upon receipt of which, the MSS deems that it has moved to a new foreign path and then initiates an MIP registration request to the HA.

S204: The Home Agent returns an MIP Registration RES message and redirects the R3 data path from the Anchor ASN-GW to the Target ASN-GW;

S205: Upon receipt of the Registration RES message returned from the Home Agent, the Target ASN-GW establishes an R3 data path, and returns to the Anchor ASN-GW a Relocate RES message which indicates that the R3 data path has been redirected successfully;

upon receipt of the Relocate RES message, the Anchor ASN-GW performs corresponding processes, such as release of the R3 connection.

According to another embodiment of the invention, the Target ASN-GW decides to redirect the R3 data path.

Figure 6:
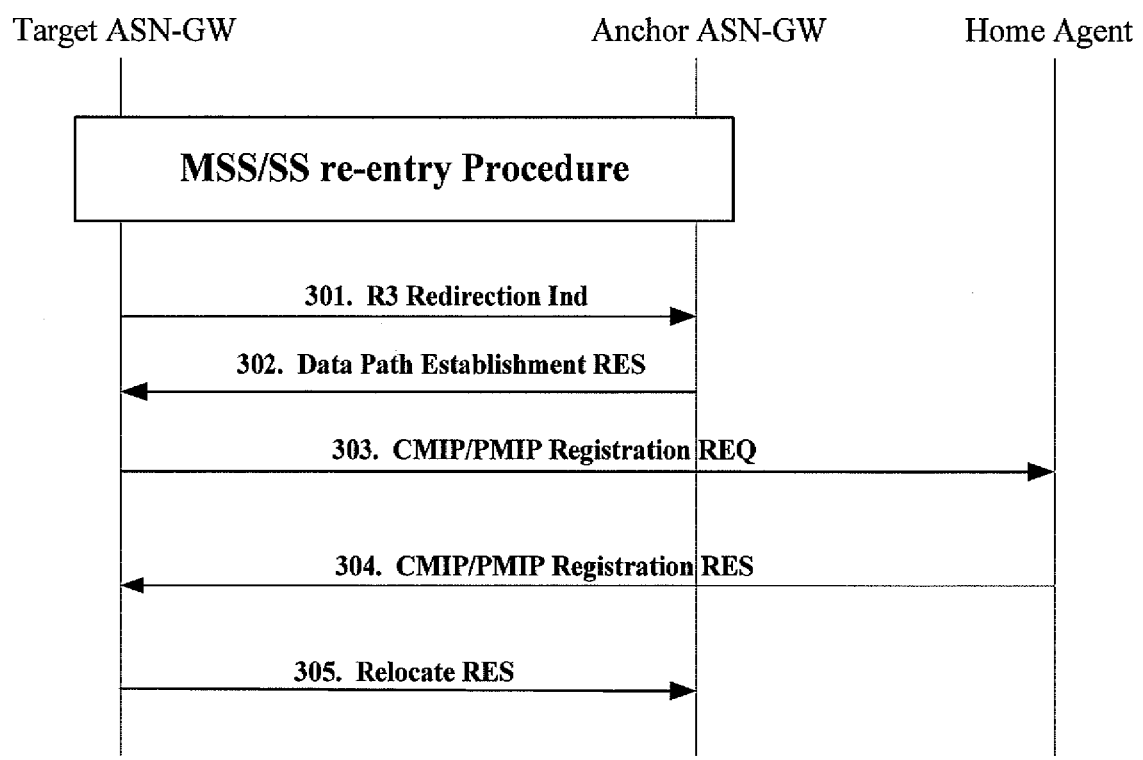
FIG. 6 is a flow diagram of the method according to an embodiment of the present invention.

After the MSS accomplishes the procedure of re-entry to the Target BS/ASN-GW, the Target ASN-GW determines according to its resource conditions (e.g. available bandwidth and congestion conditions of R3/R4 interface, etc.) that it can only redirect an R3 data path; in this case, the Anchor ASN-GW shall redirect the R3 data path unconditionally without determining; as shown in FIG. 6, the process includes the following steps:

S301: An R3 Redirection Indication (for R3 data path redirection) message is sent to the Anchor ASN-GW, to indicate the Anchor ASN-GW that an R3 data path is expected to be redirected;

the R3 Redirection Indication message carries ID information of an MSS, and the current Session Information to be redirected; the R3 Redirection Indication further carries identification information of relevant information required to redirect the R3 data path, which is used to identify which services are to be redirected, and the data path information.

Typically, the ID information of the MSS includes: MSS/SS NAI, MSS/SS MAC Address, and Anchor ASN-GW Associated with the MSS.

The Service Session information includes: List of Service Flow IDs with Associated, which includes SF Classifiers, SF QoS, Associated with the SFID, Data Path Tagging (ID) Information, etc.

The R3 Related Information includes: Home Agent IP Address, DHCP Server Address, AAA Server Address, R3 Status Details, and Security Information; where the Security Information includes: Security Information related to PKMv2 and Security Information related to Proxy MIP (if used); and further includes accounting information, and information of function entities that may need to be redirected together with an external agent, such as Anchor DPF Info, and/or Anchor SFA Info, and/or Anchor DHCP Proxy/Relay Info, and/or Anchor Accounting Client Info. Here, the information of function entities may further includes IDs of the function entities per se, including Anchor DPF ID, and/or Anchor SFA ID, and/or Anchor Accounting Client ID, and/or Anchor DHCP Proxy/Relay ID, and/or Anchor Authenticator ID; those IDs may be an IP address (an IPv4 or IPv6 address) (or an identifier not in the form of IP address) of the ASN-GW at which the respective function entities are provided.

Although not defined in the existing protocols, the R3 Redirection Indication message can be obtained by extending the existing protocols according to the information content to be carried, and the specific format of this message can be determined with reference to the existing similar messages. How to extend is well-known to those skilled in the art, and therefore will not be further described herein. Alternatively, the R3 Redirection Indication message can be obtained by extending an existing message, such as the Data Path Establishment REQ message, to add an information field required for indicating R3 redirection.

S302: Upon receipt of the R3 Redirection Indication message, the Anchor ASN-GW directly sends a Data Path Establishment RES message carrying the redirection indication information to the Target ASN-GW without determining, to instruct the Target ASN-GW to redirect the R3 data path; the Data Path Establishment RES message also carries the information related to the R3 data path redirection, such as an MSS ID, MSS Info, R3 Information, which is determined according to the relevant identification information carried in the R3 Redirection Indication message.

S303: Upon receipt of the Data Path Establishment RES message, the Target ASN-GW sends a Registration REQ message to the Home Agent for CMIP/PMIP registration, to request the Home Agent to redirect the R3 data path; here, the Registration REQ message also carries the MSS ID, the MSS Info, Classification Info, the R3 Information, etc.

S304: The Home Agent returns a Registration RES message to the Target ASN-GW and redirects the R3 data path from the Anchor ASN-GW to the Target ASN-GW.

S305: Upon receipt of the Registration RES message returned from the Home Agent, the Target ASN-GW establishes an R3 data path, and returns to the Anchor ASN-GW a Relocate RES message which indicates that the R3 data path has been redirected successfully.

Upon receipt of the Relocate RES message, the Anchor ASN-GW performs corresponding processes, such as release of the R3 connection.

As can be seen from the above, after the MSS accomplishes the procedure of re-entry to the Target BS/ASN-GW, the Target ASN-GW make a decision, according to its resource conditions (e.g. available bandwidth and congestion condition of R3/R4 data path, etc.), on whether to establish an R4 data path or redirect an R3 data path; if being able to establish an R4 data path, the Target ASN-GW choose in precedence to establish an R4 data path, and then sends the corresponding message to the Anchor ASN-GW; in the case of receiving an R4 data path establishment request message from the Target ASN-GW, the Anchor ASN-GW determines whether it is feasible to establish an R4 data path; if it is feasible to establish an R4 data path, the Anchor ASN-GW returns a response message for R4 data path establishment, otherwise, the Anchor ASN-GW returns a message instructing to redirect the R3 data path; in the case of receiving an R3 redirection request message from the Target ASN-GW, the Anchor ASN-GW directly returns an R3 data path redirection indication message without determining; in this way, the Anchor ASN-GW and the Target ASN-GW accomplish the negotiation and decision making process for interface data path establishment.

Further, the Target ASN-GW may directly send an R4 data path establishment request or an R3 data path redirection request message to the Anchor ASN-GW. It can be seen from the second embodiment and the third embodiment above that the difference from the R3 data path redirection process in the prior art lies in that: in the case of deciding to redirect an R3 data path, the Anchor ASN-GW directly returns a Relocate REQ message carrying an MSS ID, MSS Info, and R3 Information, etc., to instruct the Target ASN-GW to redirect the R3 data path, without subsequently sending a Data Path Establishment RES message carrying a redirect indication first, and then sending a Relocate REQ message carrying information related to the R3 data path upon receiving an acknowledgement message, so that the message cost is reduced, and the switching delay is shortened.

Figure 7:
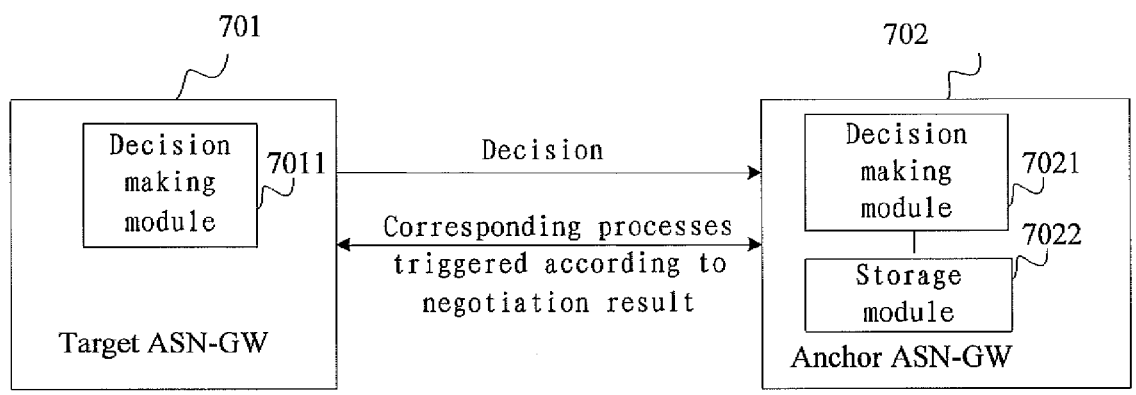
FIG. 7 is a structural schematic diagram of the system for negotiating interface data path establishment according to an embodiment of the present invention.

FIG. 7 shows a system for negotiating interface data path establishment according to an embodiment of the present invention. The system mainly includes a Target ASN-GW 701 and an Anchor ASN-GW 702 for an MSS/SS, in which:

the Target ASN-GW 701 includes: a decision making module 7011, which is adapted for making a decision on whether to establish an R4 data path or redirect an R3 data path at the Anchor ASN-GW for the MSS/SS, and sending a corresponding request to the Anchor ASN-GW 702 according to the decision; and the Anchor ASN-GW 702 includes: a determining module 7021, which is adapted for determining a negotiation result according to the corresponding request from the Target ASN-GW 701, or the corresponding request from the Target ASN-GW 701 and a local decision, and returning a reply to the Target ASN-GW 701 according to the negotiation result, so as to trigger a corresponding process.

The Anchor ASN-GW 702 further includes: a storage module 7022, which is connected to the judging module 7021, and is adapted for storing the following determining criteria:

if both the request from the Target ASN-GW and the local decision instruct to establish an R4 data path, the Anchor ASN-GW determines the negotiation result as establishing an R4 data path;

if the request from the Target ASN-GW instructs to redirect the R3 data path, the Anchor ASN-GW directly determines the negotiation result as redirecting the R3 data path; and if the request from the Target ASN-GW instructs to establish an R4 data path, but the local decision indicates to redirect the R3 data path, the Anchor AS N-GW determines the negotiation result as redirecting the R3 data path.

The process for establishing an R4 data path or redirecting an R3 data path between the Target ASN-GW and the Anchor ASN-GW according to the negotiation result is same as that described above, and therefore will not be further described herein.

Further, the present invention also relates to a computer program product for negotiating interface data path establishment. The computer program product includes computer program code portions configured to perform one or more steps of the inventive method and to realize one or more parts and/or functions of the inventive system, when the computer program code portions are run on a computing device. For example, computer program code parts, when run on the computing device, may realize one or more parts and functions of one or more of the decision making module of the Target ASN-GW and the determining module of the Anchor ASN-GW.

The computer program product may be stored on a computer-readable medium, such as a read-only memory (ROM), a random-access memory (RAM) or a flash memory. It should be understood that computer program code portions may be loaded to the computing device via a suitable data network and that the loaded computer program code portions may replace or update possible existing computer program code portions.

Those skilled in the art should recognize that various variations and modifications can be made to the present invention without departing from the spirit and scope thereof, and all these variations and modifications are intended to be within the scope of the invention as defined by the accompanying claims.

The invention claimed is:

1. A method for interface data path establishment in a WIMAX (Worldwide Interoperability Microwave Access) network comprising:
   an Anchor ASN-GW (Access Service Network Gateway), a Target ASN-GW, and a CSN (Connectivity Service Network),
   wherein an MSS/SS (Mobile Subscriber Stations/Subscriber Station) is served by the Anchor ASN-GW and accesses the CSN through an R3 data path between the Anchor ASN-GW and the CSN, the data path establishment comprising:
   deciding, by the Target ASN-GW for the MSS/SS, whether to establish an R4 data path between the Anchor ASN-GW and the Target ASN-GW or relocate the R3 data path between the Anchor ASN-GW and the CSN to between the Target ASN-GW and the CSN for the MSS/SS based on service policy and resource conditions of the Target ASN-GW, and sending a request corresponding to the decision to the Anchor ASN-GW;
   determining a result, by the Anchor ASN-GW, according to the request from the Target ASN-GW, or the request from the Target ASN-GW and a local decision made by the Anchor ASN-GW according to service policy and resource conditions of the Anchor ASN-GW,
   and returning a reply to the Target ASN-GW according to the result; wherein the determining a result by the Anchor ASN-GW comprises:

determining, by the Anchor ASN-GW, the result as establishing an R4 data path when the request from the Target ASN-GW and the local decision are to establish an R4 data path;

determining directly, by the Anchor ASN-GW, the result as relocating the R3 data path when the request from the Target ASN-GW is to relocate the R3 data path;

determining, by the Anchor ASN-GW, the result as relocating the R3 data path when the request from the Target ASN-GW is to establish an R4 data path, but the local decision is to relocate the R3 data path;

establishing a data path according to the result determined by the Anchor ASN-GW and transmitting data between the MSS/SS and CSN according to WiMAX protocol via the established data path.

2. The method according to claim 1, wherein when the result determined by the Anchor ASN-GW is to relocate the R3 data path, the method further comprises:

returning, by the Anchor ASN-GW, a message to the Target ASN-GW, containing relevant information required to redirect the R3 data path;

triggering, by the Target ASN-GW, an MIP registration initiated to a Home Agent (HA), according to the message returned; and returning, by the Target ASN-GW, a message containing the information on the R3 data path redirection result to the Anchor ASN-GW, to notify the Anchor ASN-GW of the R3 data path redirection result.

3. The method according to claim 2, wherein the information required to redirect the R3 data path comprises context information required to redirect the R3 data path, where the context information comprises Anchor DPF Info, and/or Anchor SFA Info, and/or Anchor DHCP Proxy or Relay Info, and/or Anchor Accounting Client Info.

4. The method according to claim 2, wherein the message containing the relevant information required to redirect the R3 data path returned from the Anchor ASN-GW to the Target ASN-GW is a message provided with R3 redirection indication information, and also with an extended information field for carrying the relevant information required to redirect the R3 data path.

5. The method according to claim 1, if the result determined by the Anchor ASN-GW is to establish an R4 data path, the method further comprises: establishing, by the Anchor ASN-GW, an R4 data path, and returning an R4 data path establishment request message to the Target ASN-GW; and establishing, by the Target ASN-GW, an R4 data path according to the message returned, and returning an acknowledgement message of the R4 data path establishment to the Anchor ASN-GW.

6. The method according to claim 2, wherein, if the request from the Target ASN-GW is to relocate the R3 data path, then identification information of the relevant information required to redirect the R3 data path and to be returned from the Anchor ASN-GW is carried in a message of the request; and the Anchor ASN-GW returns the relevant information corresponding to the identification information to the Target ASN-GW.

7. The method according to claim 1, wherein, the Target ASN-GW and/or the Anchor ASN-GW choose in precedence to establish an R4 data path over choosing to relocate an R3 data path in making the decision.

8. A system for interface data path establishment in a WIMAX (Worldwide Interoperability Microwave Access) network, comprising:

a Target ASN-GW (Access Service Network GateWay), an Anchor ASN-GW, and a CSN (Connectivity Service Network), wherein an MSS/SS (Mobile Subscriber Stations/Subscriber Station) is served by the Anchor ASN-GW and accesses the CSN through an R3 data path between the Anchor ASN-GW and the CSN and wherein:

the Target ASN-GW comprises a decision making module configured to decide whether to establish an R4 data path between the Anchor ASN-GW and the Target ASN-GW or relocate an R3 data path between the Anchor ASN-GW and the CSN (Connectivity Service Network) to between the Target ASN-GW and the CSN for the MSS/SS according to service policy and resource conditions of the Target ASN-GW, and send a request corresponding to the decision to the Anchor ASN-GW; and the Anchor ASN-GW comprises a determining module configured to determine a result according to the request from the Target ASN-GW, or the request from the Target ASN-GW and a local decision made by the Anchor ASN-GW according to service policy and resource conditions of the Anchor ASN-GW, wherein the Anchor ASN-GW further comprises:

a storage module connected to the determining module, configured to store determining criteria comprising:

when the request from the Target ASN-GW and the local decision are to establish an R4 data path, the Anchor ASN-GW determining the result as establishing an R4 data path;

when the request from the Target ASN-GW is to relocate an R3 data path, the Anchor ASN-GW determining directly the result as relocating an R3 data path; or when the request from the Target ASN-GW is to establish an R4 data path, but the local decision is to relocate an R3 data path, the Anchor ASN-GW determining the result as relocating an R3 data path;

wherein the Anchor ASN-GW is further configure to return a reply to the Target ASN-GW according to the result, wherein the result is determined by the Anchor ASN-GW according to the stored determining criteria;

wherein the Target ASN-GW is further configure to establish a data path according to the result determined by the Anchor ASN-GW and transmit data between the MSS/SS and CSN according to WiMAX protocol via the established data path.

9. A method for establishing an interface data path in a WIMAX (Worldwide Interoperability Microwave Access) network, wherein the WIMAX network comprises: an Anchor ASN-GW (Access Service Network GateWay), a Target ASN-GW and a CSN (Connectivity Service Network), and wherein an MSS/SS (Mobile Subscribe Station/Subscribe Station) is served by the Anchor ASN-GW and accesses the CSN through an R3 data path between the Anchor ASN-GW and the CSN, the method comprising:

when the Target ASN-GW determines to establish an R4 data path between the Target ASN-GW and the Anchor ASN-GW, sending, by the Target ASN-GW, a Data Path Establishment REQ message to the Anchor ASN-GW to initiate an R4 data path establishment procedure, when the Anchor ASN-GW determines to establish the R4 data path, returning, by the Anchor ASN-GW, a Data Path Establishment RES message including relevant information for establishing the R4 data path; receiving, by the Target ASN-GW, the Data Path Establishment RES message; establishing, by the Target ASN-GW, the R4 data path according to the relevant information carried in the Data Path Establishment RES message to make the MSS/SS access the CSN through the R4 data path and the R3 data path;

when the Target ASN-GW determines to establish an R4 data path between the Target ASN-GW and the Anchor ASN-GW, sending, by the Target ASN-GW, a Data Path Establishment REQ message to the Anchor ASN-GW to initiate an R4 data path establishment procedure, when the Anchor ASN-GW determines to relocate the R3 data path to a location between the Target ASN-GW and the CSN, returning, by the Anchor ASN-GW, a Data Path Establishment RES message including information related to the R3 data path relocation; receiving, by the Target ASN-GW, the Data Path Establishment RES message; establishing, by the Target ASN-GW, the R3 data path according to the information carried in the Data Path Establishment RES message to make the MSS/SS access the CSN through the R3 data path between the Target ASN-GW and the CSN;

when the Target ASN-GW determines to relocate the R3 data path to the location between the Target ASN-GW and the CSN, sending, by the Target ASN-GW, an R3 Redirection Indication message to the Anchor ASN-GW, returning, by the Anchor ASNGW, a Data Path Establishment RES message including information related to the R3 data path relocation; receiving, by the Target ASN-GW, the Data Path Establishment RES message; establishing, by the Target ASN-GW, the R3 data path between the Target ASN-GW and the CSN according to the indication information carried in the Data Path Establishment RES message to make the MSS/SS access the CSN through the R3 data path.

10. The method of claim 9, wherein the establishing, by the Target ASN-GW, the R3 data path between the Target ASN-GW and the CSN according to the indication information comprises:

sending, by the Target ASN-GW, a Registration REQ message to a Home Agent, wherein the Registration REQ message carries information related to the R3 data path relocation;

relocating, by the Home Agent, the R3 data path to the location between the Target ASN-GW and the CSN, and returning a Registration RES message to the Target ASN-GW;

establishing, by the Target ASN-GW, an R3 data path, and returning a Relocate RES message which indicates that the R3 data path has been redirected successfully to the Anchor ASN-GW.

* * * * *